Jan. 10, 1939.　　　G. T. SCHMIDLING　　　2,143,527

FLUORESCENT ILLUMINATING DEVICE

Filed Oct. 6, 1934　　　3 Sheets-Sheet 3

INVENTOR.
Gilbert T. Schmidling
BY Ramsey & Kent
his ATTORNEYS

Patented Jan. 10, 1939

2,143,527

UNITED STATES PATENT OFFICE 2,143,527

FLUORESCENT ILLUMINATING DEVICE

Gilbert T. Schmidling, Kew Gardens, N. Y., assignor to Eastern Electronics Research Inc., Brooklyn, N. Y., a corporation of New York Application October 6, 1934, Serial No. 747,162

3 Claims. (Cl. 250—141)

The present invention relates to a fluorescent illuminating device, wherein the brilliant fluorescence is produced by cathode rays acting upon fluorescent materials enclosed in a glass chamber which has been exhausted to a very high vacuum.

The surface upon which the luminescent materials are mounted preferably is a cold metallic anode which is located in the path of cathode rays preferably emanating from a hot cathode. This luminescent anode may be composed of various materials, but one material which gives particularly satisfactory results is a plate of nickel. Other metals may be used such as magnesium, copper, etc. The plate may have an oxidized surface, for example, a copper plate covered with oxide of copper.

Intermediate the cathode and the anode is an electronic lens constructed to spread the beam of cathode rays into the form of a cone so that the entire area of the luminescent anode is within the path of the spread cathode ray beam which reacts with the entire area of the luminescent anode.

The anode may take the form of a figure, shown either in silhouette or by a painted configuration on the anode plate, and various portions of the figure may be coated with luminescent materials which will give off visual rays of different colors so that when the device is operating, a brilliantly illuminated colored figure will be produced. Where this arrangement is used, the device is particularly effective as an advertising medium. The cathode ray being invisible, the entire illumination emanates from the fluorescent figure, which is illuminated over the entire surface area where a luminescent material is provided. In this way, extremely brilliant and beautiful color effect may be produced.

Where the device is used for illumination, the luminescent anode is preferably arranged in the form of a cone comprising a metallic anode member covered with a luminescent material that is bombarded over its entire surface to produce visual light rays which will illuminate a substantial area around the device. Since a very large area is producing illuminating light rays, the intensity of the illumination is not condensed in a small spot as is the case with the ordinary electric light. The result is less dense shadows and less eye strain for the same total amount of illumination. Since the luminosity of the fluorescent material emanates directly from the surface which is bombarded, much more brilliant luminescence is obtained than where luminous salts are applied to glass and bombarded on the side opposite to the side from which the effect is viewed.

Another characteristic of the present invention is that a relatively large surface is used as an emitter for the cathode rays and this surface is uniformly heated by a suitable electrical heater in such manner that the cathode emanations are uniform over this large surface area and do not present an image of the heating coil. Since the rays emanate from the hot cathode and travel toward the cold luminescent anode, the present device operates by use of an alternating current, in view of the fact that luminescent materials, when once activated by electronic bombardment, remain active for a substantial interval without greatly diminishing in brilliance. Consequently, the ordinary alternating current activates the luminescent materials at a rate so far above the luminescent lag of the salts as to prevent any detection whatever of variation in luminosity because of the intermittent bombarding action produced by the alternating current which is automatically rectified by the hot cathode and the cold anode. While the potential applied to the electronic lens is reversed for each alternating current cycle, this potential always bears the correct relation to the cathode rays when these rays are emanating from the hot cathode and travelling toward the cold luminescent anode, and, therefore, the beam is always properly spread. This is because the rays are only emitted when the cathode is negative relatively to the anode. Preferably, the luminescent anode is angularly disposed relative to the axis of the cathode tube and relative to the axis of the cone of cathode rays. This renders the luminescent surface effective for bombardment and is an advantage in viewing the image particularly where the device is used in show windows for advertising purposes.

Since the cathode emitter is of relatively large area and is uniformly heated, so as not to form an image of the heating element, the cathode emanations are uniform in density as to a cross-section thorugh the beam, and, therefore, uniformly activate the luminescent substances on the luminous anode, thereby obviating bright spots or an over-activation of any particular part of the anode luminous surface.

Furthermore, by obtaining the necessary volume of cathode emanations from a large surface, the required volume of emanations to obtain desirable activation of the luminescent material is accomplished by the use of a relatively low voltage between the hot cathode and the luminescent anode so that production of dangerous rays is entirely avoided.

The fluorescent is increased by causing the cathode tube to act as a regenerative element in the circuit, and therefore, reactance coils are introduced in the high potential circuit between the hot cathode and the cold anode, so that a regenerative action is established. While an impedance may be established in the circuit, preferably, the internal resistance of the tube is sufficient for this purpose, and tuning of the regenerative circuit is accomplished by the reactance coils. Preferably, this circuit is tuned to 3000 k. c. which produces a wave length of approximately 150 meters that at present is within one of the least used bands of radio frequency. The majority of the wiring for operating the present device is concealed or shielded so that there is little danger of emanations from the device extending to any substantial distance from the apparatus and thereby there is very little danger of any interference in the radio field even with a radio apparatus working on the same wave length.

Preferably, the luminescent materials utilized to produce the luminescent anode screen are suitable well known luminescent salts, for example, synthetic willemite, that may be supplied with a sufficiently small amount of oxygen that is so combined with the salt as not to be driven away from the anode when the device is operating on voltages sufficiently high to satisfactorily activate the luminescent material. The luminescent materials may be applied to the metallic anode in various ways, one of which is to apply a thin coating of sodium silicate to the anode and then spray powdered luminescent material in dry form against the sodium silicate and subsequently dry the sodium silicate to cement the attached particles to the metal anode.

Preferably, the transformer coils and the circuit wires for the device are mounted in shielded portions of a suitable framework comprising a base, a top, and a connecting conduit which support the tube; and preferably, the shielded parts of this framework are grounded so that the entire device comprises a compact unitary construction in which there is no danger of leakage of rays or waves which might be injurious to operators.

The present invention may be utilized to produce animated fluorescent figures on the luminescent anode by focusing the cathode beam as a spot and then utilizng devices well known in the art for rotating or moving the spot over the area in which animation is desired. In view of the fact that substantial energy is produced by electrons bombarding the anode, animation may be obtained by utilizing the turbine effect of such energy upon suitably mounted turbine wheels arranged relative to the image which is to be animated, for example, if the image comprises an automobile, the wheels may be caused to rotate by forming the wheels as miniature turbines and these may revolve under the bombardment of the cathode beam or the wheels may be made stationary and spots of cathode rays may be rotated over the areas representing the wheels in such manner as to simulate motion.

Other features and objects of the present invention will in part be obvious and will in part be pointed out hereinafter in the specification to follow.

It is recognized that the present invention may be embodied in constructions other than those specifically disclosed herein and, therefore, the present disclosure is to be understood as illustrative and not in the limiting sense.

Referring now more especially to the drawings forming a part of this specification:—

Figure 1:
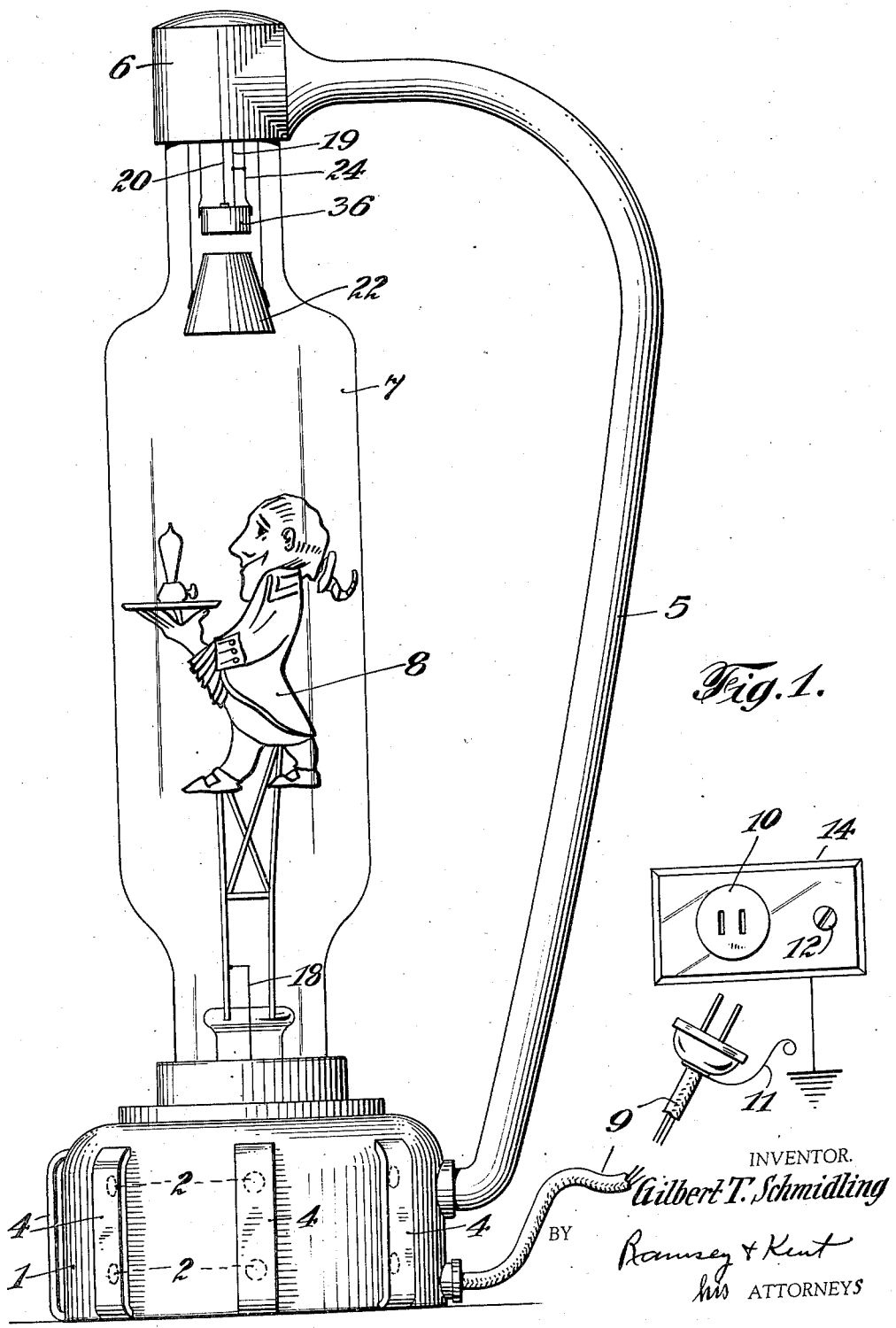
Fig. 1 is an elevational view of a complete device comprising the preferred embodiment of the present invention.

Referring now to the drawings and more particularly to Fig. 1, a base 1 encloses transformer coils, etc., and is provided with ventilating openings 2 which are covered by shields 4 preferably formed integral with the base. A conduit tube 5 leads from the base to a top 6 in which are arranged suitable electrical connections for the operation of the electrical members in the upper end of a tube 7. The base 1 is also provided with a suitable electrical connection for the circuit leading to the luminescent anode 8. The base 1, the top 6, and the tube 7 are all shielded in such manner as to prevent electrical disturbances escaping from these members. A suitable connection 9 leads from the electrical apparatus in the base to an electrical socket 10 and this connection preferably is provided with a ground wire 11 which may be attached to the plate screw 12 that connects with the plate 14 of the socket 12, which plate is grounded.

The various configurations of the figure comprising the luminescent anode 8 are covered with luminescent salts well known in the art to produce different visual light rays; for example, the coat of the figure may be coated with salts which when activated appear red, the trousers blue, the stockings white, the face and hands orange and other colors arranged as desired over the figure. These colors are not apparent until the device is in operation, at which time they stand out brilliantly.

Figure 2:
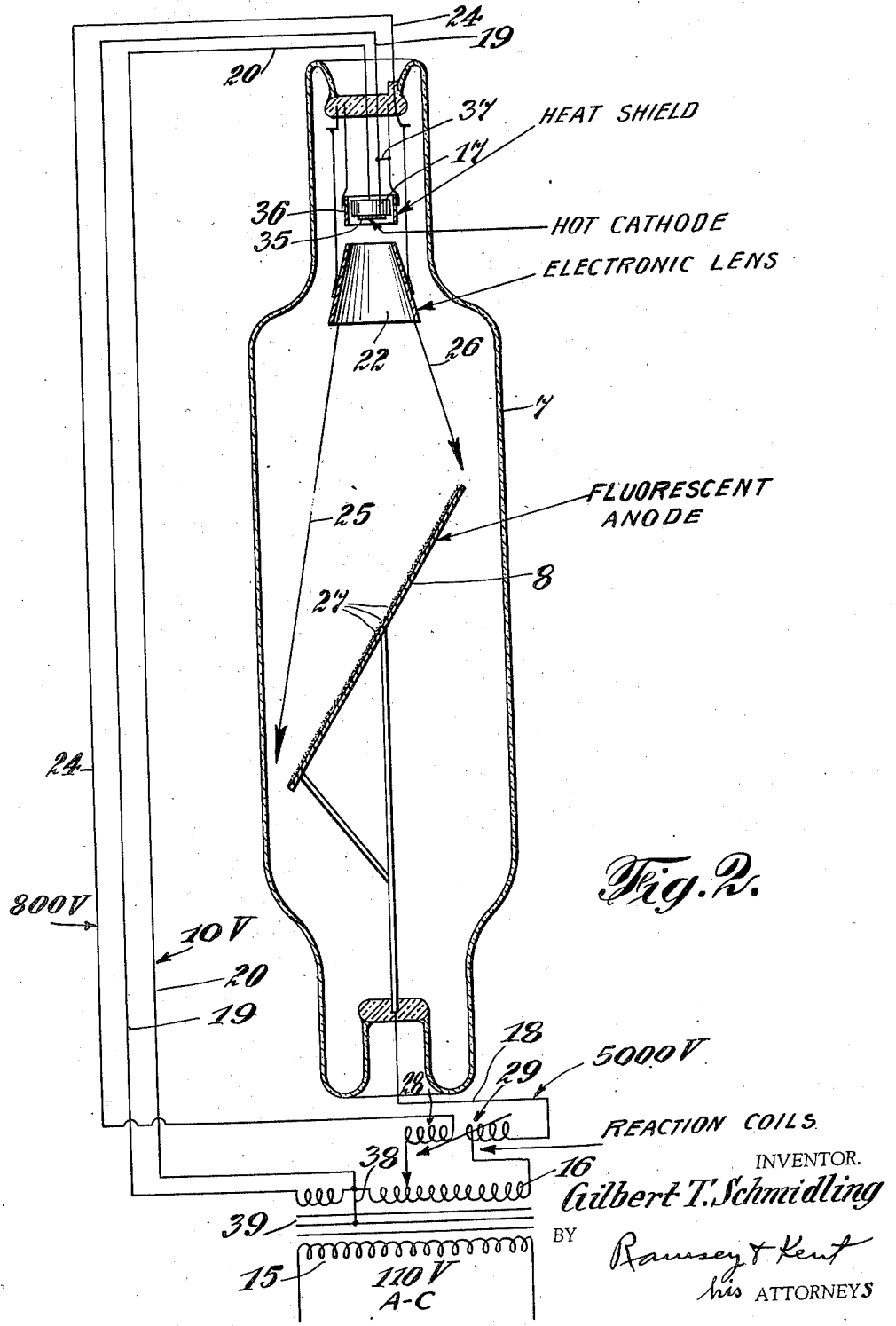
Fig. 2 is a more or less diagrammatic view illustrating the electrical circuits and showing portions of the device in section.

Referring now to Fig. 2, the operating current may be introduced as 110 volt alternating current to the primary 15 of a transformer. The secondary 16 of the transformer may be tapped in such manner as to establish a relatively high voltage between the fluorescent anode 8 and the cathode emitter 17. This circuit 18—19 preferably carries substantially 5000 volts. The secondary is also tapped to provide a low voltage circuit 19—20 of preferably 10 volts to provide electrical energy for heating the heating coil 21 (Figs. 3 and 4) of the cathode emitter 17. An electronic lens 22 is supported in position to embrace the beam of electrons between the cathode emitter 17 and the luminescent anode 8. This dispersing anode or electronic lens 22 is in the circuit 19—24 and this circuit preferably carries approximately 800 volts. The dispersing anode or electronic lens is preferably constructed of metal in the frustum of a hollow cone. This hollow cone is positioned adjacent or near by the cathode emitter and the construction and arrangement of the parts and circuits is such that this electronic lens spreads the beam of electrons from the cathode emitter 17 in the form of a cone beam as indicated by the rays 25—26 in Fig. 2 to completely cover the surface of the luminescent anode 8, the surface of which is covered by luminescent salts. Preferably, the coated surface of this anode 8 presents an inclined area to the spread beam of electrons in such manner that the electrons are effectively directed against the surface to activate the salts 27 thereon.

The circuit 18—24 is provided with a pair of reaction coils 28 and 29 which are inductively coupled and are suitably wound in such manner as to establish regeneration in the tube circuit. The internal resistance of the tube presents sufficient impedance to permit the reactance coils 28—29 to be so tuned as to establish the desired oscillations, and preferably, these oscillations are 3000 k. c. or a wave length of substantially 150 meters.

Figure 3:
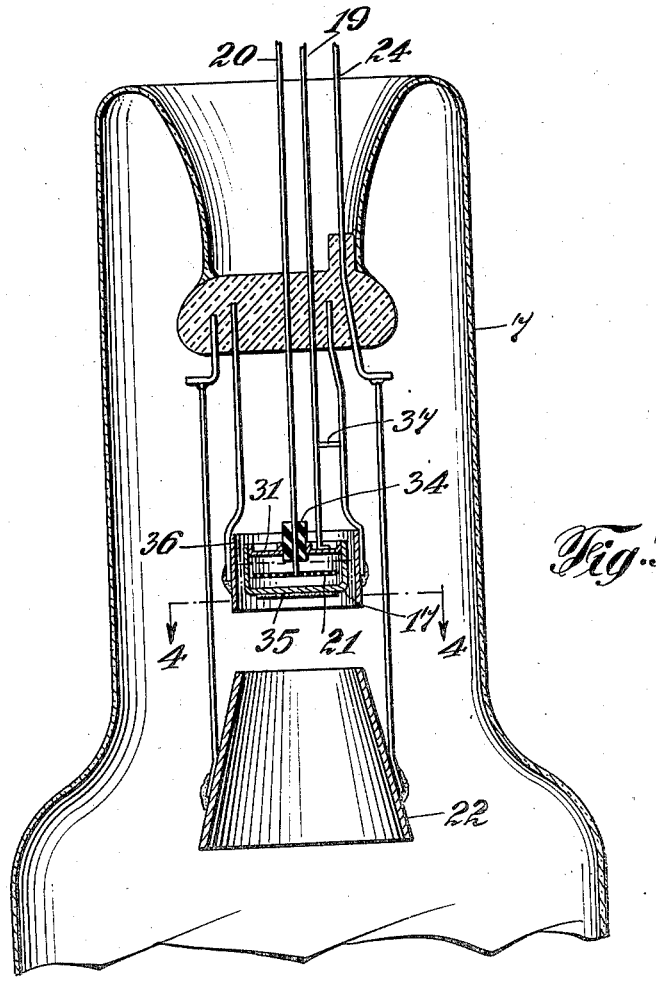
Fig. 3 is a detailed view of the cathode emitter and the electronic lens showing the parts in section.
Figure 4:
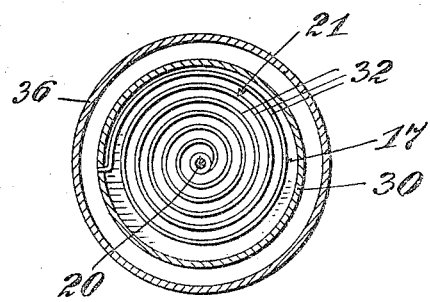
Fig. 4 is a view on the section line 4—4 of Fig. 3.

Referring now to Figs. 3 and 4, the cathode emitter 17 comprises a shell 30, preferably of nickel, which is closed by a flanged disc 31 to enclose a heating element 32 that is preferably in the form of a flat spiral. This heating element is connected at one end to the shell 30 and is connected at the other end with the circuit wire 20. The wire 20 passes through an insulating tube 34, thereby insulating this portion of the circuit from the shell or flanged disc 31. The circuit wire 19 is attached to the disc 31 or the shell 30, thereby completing the circuit through the heating element 32. Preferably, the flanged disc 32 is welded permanently to the shell 30. The heating element 32 is arranged adjacent the top of the shell 30 which carries a coating 35 of electronic emitting oxides or materials well known in the art. The effect of the heating element is to radiate heat directly to the top of the shell and to heat this portion of the sheet uniformly, thereby uniformly heating the emitter coating 35, consequently, obviating any pattern which would be produced by emitted electrons if the heating element were directly coated with the emitting material. Preferably, the cathode emitter is surrounded by a heat reflecting shell 36 which may have a polished interior surface to prevent escape of heat rays from the hot cathode. This heat reflector preferably is grounded by connection 37 with the circuit 19.

The secondary 16 of the transformer is also preferably grounded by the connection 38 to the transformer core 39.

Luminescent salts 27 may be placed closely adjacent to the anode 8 but preferably are mounted directly on the anode and they may be secured to the anode 8 by various means, but preferably, by the use of sodium silicate as a cement applied to the anode which is then covered by small particles of the said luminescent materials. This metallic anode may be covered with an oxide which may be utilized to provide a small amount of oxygen which seems to react with the luminescent salts to increase their life and brilliance.

During the manufacture of the tube, after the parts are assembled, the tube is exhausted to as high a degree of vacuum as is attainable by the present well known means of exhausting tubes of this character, so that the electronic bombardment of the luminescent salts on the anode within the tube is carried out in an extremely high vacuum. The results are that the tube runs with a very low expenditure of electrical energy for the amount of illumination obtained. In other words, the device comprises a very efficient apparatus for transforming electrical energy into light rays. The luminescent salts may be combined in different ways by utilizing salts well known in the art to produce any shade of color desired and also to produce white light which is a very close simulation of sunlight. The colors may be blends, or may be distinctive in the form of pictorial representations, or the salts may be used to produce solid colors as a source of colored light.

What I claim is:—

1. A cathode ray tube comprising a hot cathode, an anode, disposed at an acute angle to the path of emitted particles from the cathode, fluorescent material carried by said anode, dispersing means to disperse the particles from the cathode to cause the said particle emission zone to cover said anode, and a highly evacuated chamber enclosing said cathode and said anode.

2. A cathode ray tube comprising a hot cathode, an anode, fluorescent material carried by said anode, the surface of said anode carrying said fluorescent material presenting an obtuse angle to the direction of flow of electrons, dispersing means to spread the zone of particles emitted from the cathode to cover the anode, and a non-gaseous highly evacuated chamber enclosing said cathode and said anode.

3. A cathode ray tube comprising a hot cathode emitter of large area, flat spiral heating means adjacent said emitter to uniformly heat the same to produce a wide beam of electrons from said emitter, means to receive the full beam from said emitter and to cause said electrons to spread into a conical shaped beam, an anode disposed at an acute angle to said beam and carrying luminescent material in the path of said beam and being adapted to be bombarded by said beam, and an envelope within which said beam is effective.

GILBERT T. SCHMIDLING.